United States Patent [19]
Kadoi et al.

[11] Patent Number: 5,949,928
[45] Date of Patent: Sep. 7, 1999

[54] FILTER INSERTION TYPE OF OPTICAL BRANCH APPARATUS

[75] Inventors: Takayuki Kadoi; Yoshiyuki Hiramoto; Hiromasa Nemoto, all of Ibaraki, Japan

[73] Assignee: Hitachi Cable, Ltd., Tokyo, Japan

[21] Appl. No.: 08/976,177

[22] Filed: Nov. 21, 1997

[30]     Foreign Application Priority Data

Jun. 2, 1997   [JP]   Japan .................................. 9-143767

[51] Int. Cl.$^6$ ....................................................... G02B 6/12
[52] U.S. Cl. .............................................. 385/14; 385/45
[58] Field of Search .................................. 385/14, 15, 16, 385/17, 22, 45

[56]           References Cited

U.S. PATENT DOCUMENTS

| 5,064,263 | 11/1991 | Stein | 385/14 |
| 5,355,424 | 10/1994 | Idler et al. | 385/14 |
| 5,799,120 | 8/1998 | Kurata et al. | 385/45 |

*Primary Examiner*—Hung N. Ngo
*Attorney, Agent, or Firm*—McDermott, Will & Emery

[57]            ABSTRACT

An optical filter is provided to be on a side of the output ports relative to a branch port of the first stage in an optical branch apparatus. The optical filter transmits a signal light and reflects a monitor light, so that signal lights are obtained at output ports, and the monitor light is returned to an optical transmitter to detect an abnormal state of an optical fiber transmission line.

6 Claims, 3 Drawing Sheets

FILTER INSERTION TYPE OF OPTICAL BRANCH APPARATUS

FIELD OF THE INVENTION

The invention relates to a filter insertion type of an optical branch apparatus, and more particularly to, a filter insertion type of an optical branch apparatus used to increase a reflection attenuation and suppress an optical propagation loss.

BACKGROUND OF THE INVENTION

A conventional filter insertion type of an optical branch apparatus comprises an input port for receiving a signal light having a wavelength of, for instance, 1.3 μm and a monitor light having a wavelength of, for instance, 1.55 μm, a plurality of output ports for supplying terminals with branched signal lights, optical waveguides connected in turn by branch ports formed at a plurality of stages to provide an input optical waveguide to be connected to the input port and a plurality of output optical waveguides to be connected to the plurality of output ports, and an optical filter provided to intersect the input optical waveguide at a predetermined angle between the input port and the branch port of the first stage, so that the monitor light is reflected in the direction of the input port by the optical filter, while the signal light is transmitted through the optical filter to be transmitted through the branched optical waveguides to the plurality of output ports.

A conventional optical fiber line-managing system comprises an optical fiber line monitor for supplying the signal light and the monitor light through the optical fiber line to the filter insertion type of the optical branch apparatus. The optical fiber line monitor comprises an OTDR (Optical Time Domain Reflectmeter) for emitting the monitor light to be supplied through the optical fiber line to the optical branch apparatus and receiving the monitor light which is reflected from the optical filter of the optical branch apparatus to detect an abnormal state of the optical fiber line, an optical signal-emitting unit for emitting the signal light to be supplied through the optical fiber line to the optical branch apparatus, and an optical coupler for coupling the monitor and signal lights to be transmitted through the optical fiber line to the optical branch apparatus and receiving the reflected monitor light to be received in the OTDR.

In operation, the monitor light is emitted from the OTDR through the optical coupler and the optical fiber line to be supplied to the optical branch apparatus. In the optical branch apparatus, the monitor light is reflected through the optical fiber line and the optical coupler by the optical filter, and the reflected monitor light is received in the OTDR. Consequently, an abnormal state is detected in the OTDR in accordance with the receipt of the reflected monitor light.

In the conventional filter insertion type of an optical branch apparatus, however, there are disadvantages in that the reflected signal light is increased to decrease the reflection attenuation at 48 dB to 53 dB, and then a reflected light which has a variety of phases and amplitudes is increased to be returned to the optical signal-emitting unit, because the optical filter is provided to intersect the input optical waveguide.

Further, the conventional optical branch apparatus has a disadvantage in that it is easy to occur noise, because a lasing mode of a laser light is to be instable, when the reflected light is incident to a resonator of a semiconductor laser which is a light source.

Even further, the conventional optical branch apparatus has disadvantages in that if a process accuracy is low, the optical loss is increased, and a substrate is broken and/or cracked in a washing process of the optical branch apparatus, because the slit into which the optical filter is inserted is formed by a groove process.

Where the reflect attenuation (Q) is calculated based on a ratio of an optical power ($P_1$) of the signal light supplied to an incident terminal of an optical device from the light source such as a semiconductor laser, etc. and an optical power ($P_2$) of the reflected light from the incident terminal, as follows:

$$Q(dB) = -10 \log_{10}(P_2/P_1) \qquad (1)$$

As shown by the above expression (1), the reflected light is large when the reflection attenuation is small. For reliability, the reflection attenuation needs generally over 50 dB.

SUMMARY OF THE INVENTION

Accordingly, it is an object of the invention to provide a filter insertion type of an optical branch apparatus in which the sufficient reflection attenuation is obtained, even if the optical filter is set on the optical waveguide.

It is another object of the invention to provide a filter insertion type of an optical branch apparatus in which the optical loss is suppressed, and the break and/or crack of the optical branch apparatus are avoided at the slit process.

According to the invention, a filter insertion type of an optical branch apparatus comprises an input port for receiving input lights of first and second predetermined wavelengths, output ports for supplying output lights obtained by branching the light of the first predetermined wavelength, optical waveguides branched by branch ports of first to Nth stages, one of the optical waveguides being connected to the input port, and a predetermined number of the optical waveguides being connected to the output ports, where N is a positive integer, and an optical filter to intersect a predetermined number of the optical waveguides for transmitting the light of the first predetermined wavelength, and reflecting the light of the second predetermined wavelength, the optical filter being provided to be on a side of the output ports relative to a branch port of the first stage.

BRIEF DESCRIPTION OF THE DRAWINGS

The invention will be described in more detail in conjunction with the accompanying drawings, wherein.

DETAILED DESCRIPTION OF THE PREFERRED EMBODIMENTS

Before explaining a filter insertion type of an optical branch apparatus in the preferred embodiment according to the invention, the above mentioned conventional filter insertion type of an optical branch apparatus will be explained in FIGS. 1 and 2.

Figure 1:
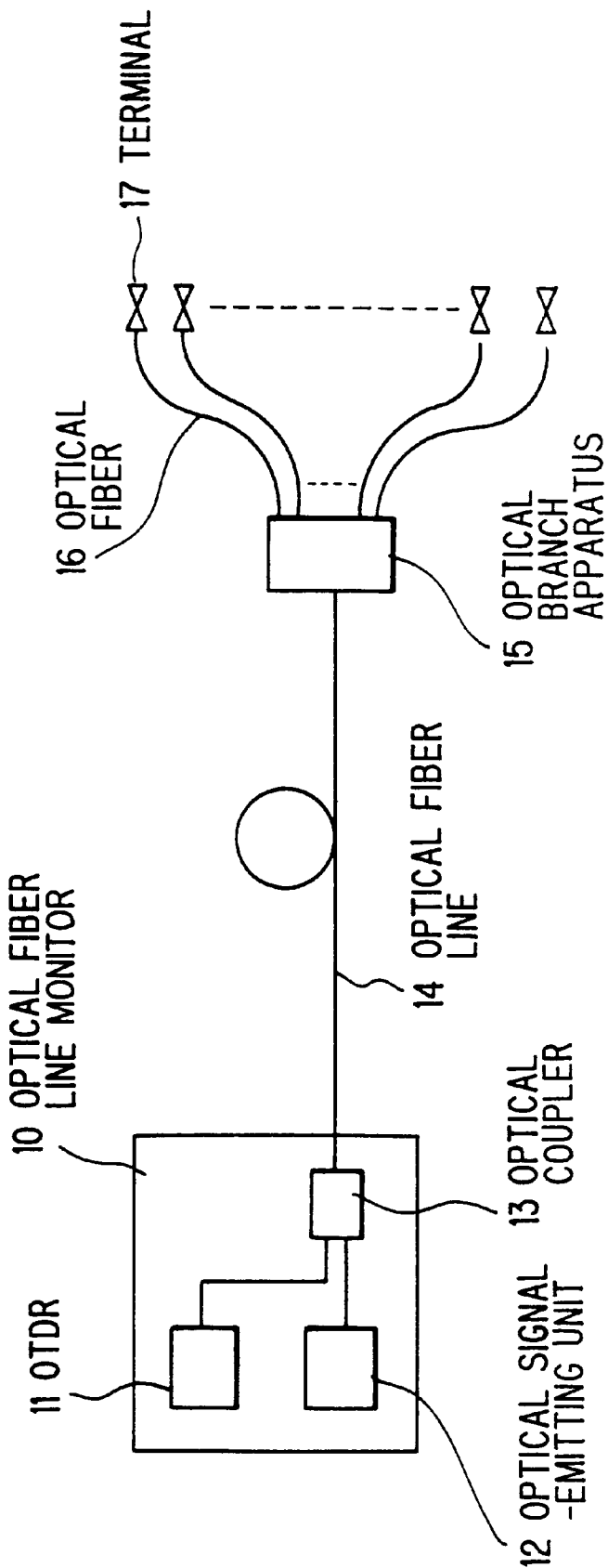
FIG. 1 is a block diagram of a conventional optical fiber line managing system.

FIG. 1 shows a conventional optical fiber line-managing system. In FIG. 1, the conventional optical fiber line-managing system comprises an optical fiber line monitor 10 for supplying the signal light and the monitor light through the optical fiber line 14 to the filter insertion type of the optical branch apparatus 15. The optical fiber line monitor 10 comprises an OTDR (Optical Time Domain Reflectmeter) 11 for emitting the monitor light to be supplied through the optical fiber line 14 to the optical branch apparatus 15 and receiving the monitor light which is reflected from the optical filter 22 (shown in FIG. 2) of the optical branch apparatus 15 to detect an abnormal state of the optical fiber line 14, an optical signal-emitting unit 12 for emitting the signal light to be supplied through the optical fiber line 14 to the optical branch apparatus 15, and an optical coupler 13 for coupling the monitor and signal lights to be transmitted through the optical fiber line 14 to the optical branch apparatus 15 and receiving the reflected monitor light to be received in the OTDR 11. Terminals 17 are connected to the optical branch apparatus 15 by optical fibers 16.

Figure 2:
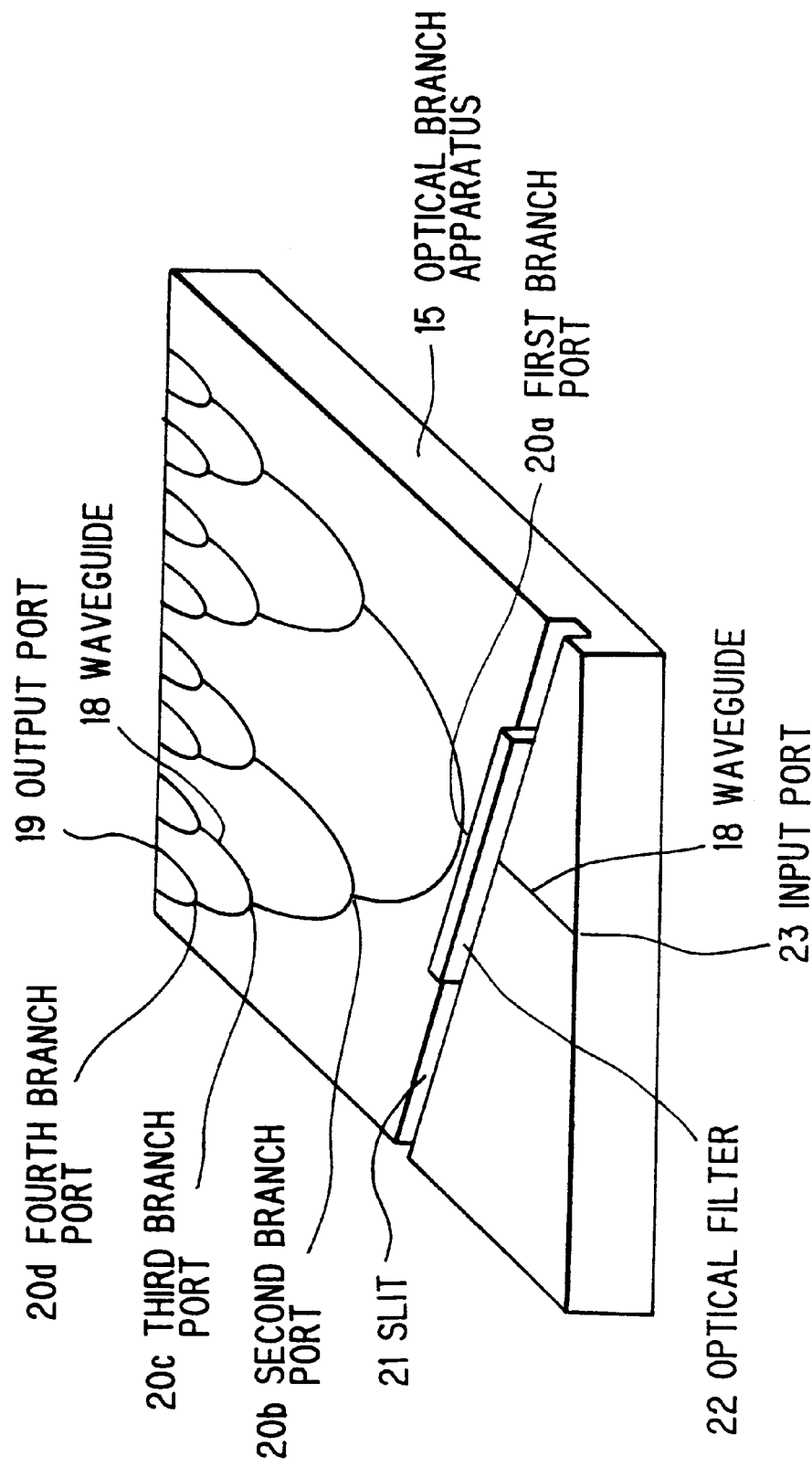
FIG. 2 is a schematic diagram of a conventional filter insertion type of an optical branch apparatus.

FIG. 2 shows a conventional filter insertion type of an optical branch apparatus. In FIG. 2, the conventional filter insertion type of the optical branch apparatus 15 comprises an input port 23 for receiving a signal light having a wavelength of, for instance, 1.3 μm and a monitor light having a wavelength of, for instance, 1.55 μm, a plurality of output ports 19 for supplying fiber line 14 is normal or abnormal in accordance with the reflected light from the optical filter 22.

Next, a filter insertion type of an optical branch apparatus in the preferred embodiment according to the invention will be explained in FIG. 3.

Figure 3:
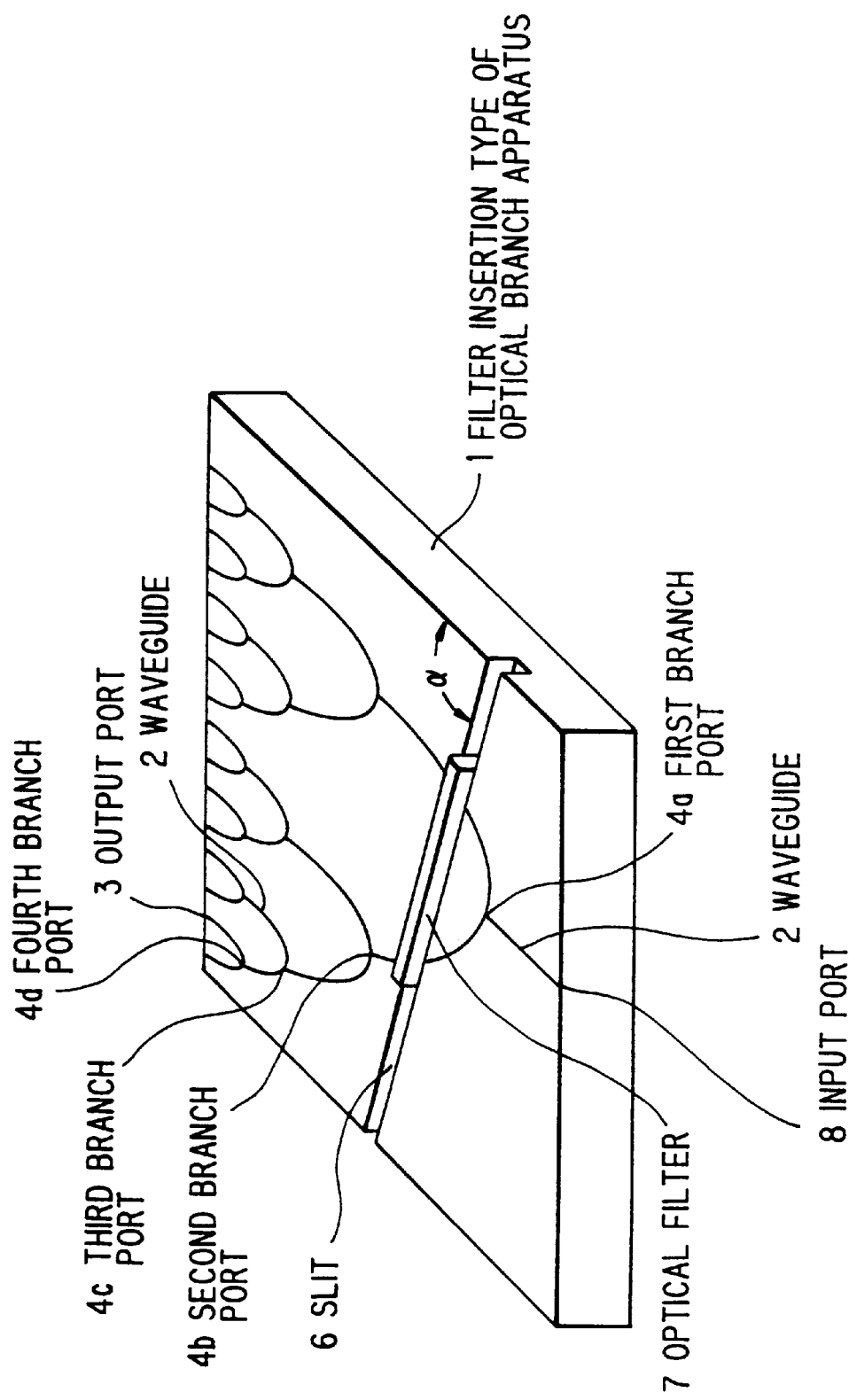
FIG. 3 is a schematic diagram of a filter insertion type of an optical branch apparatus of a preferred embodiment of the present invention.

In FIG. 3, the filter insertion type of the optical branch apparatus 1 comprises an input port 8 for receiving a signal light having a wavelength of, for instance, 1.3 μm and a monitor light having a wavelength of, for instance, 1.55 μm, a plurality of output ports 3 for supplying terminals with branched signal lights, optical waveguides 2 connected in turn by branch ports (4a–4d) formed at a plurality of stages to provide an input optical waveguide 2 to be connected to the input port 8 and a plurality of output optical waveguides 2 to be connected to the plurality of output ports 3, and an optical filter 7 provided between the branch port 4a of the first stage and the branch ports 4b of the second stage. A slit 6 is formed on a SiO₂ substrate for the filter insertion type of the optical branch apparatus 1 at a predetermined angle α, and the optical filter 7 is inserted into the slit 6.

The slit 6 is formed to have a width larger than a thickness of the optical filter 7 by 10 to 20 μm, and a depth of 8 to 12%, preferably 10% of a thickness of the optical branch apparatus (SiO₂ substrate) 1 by using a dicing blade. Further, the angle α of the slit 6 relative to a side face of the optical branch apparatus 1, namely, relative to an optical axis of an incident light at the input port 8 is set to be within 82 to 84 degrees.

The operation of the filter insertion type of the optical branch apparatus 1 of the present invention will be explained in the terminals 17 (shown in FIG. 1) with branched signal lights, optical waveguides 18 connected in turn by branch ports (20a–20d) formed at a plurality of stages to provide an input optical waveguide 18 to be connected to the input port 23 and a plurality of output optical waveguides 18 to be connected to the plurality of output ports 19, and an optical filter 22 provided to intersect the input optical waveguide 18 at a predetermined angle between the input port 23 and the branch port 20a of the first stage, so that the monitor light is reflected in the direction of the input port 23 by the optical filter 22, while the signal light is transmitted through the optical filter 22 to be transmitted through the branched optical waveguides 18 to the plurality of output ports 19.

The slit 21 is formed on the input optical waveguide 18 by a groove process using a dicing-blade. After inserting the optical filter 22 into the slit 21, the optical filter 22 is fixed in the slit 21 by using a silicon bonding agent with a small hardening contraction.

In the conventional optical fiber line-managing system, the monitor light having a wavelength of 1.55 μm, which is emitted by the OTDR 11, is incident into the optical coupler 13 to be coupled with the signal light having a wavelength of 1.3 μm, which is emitted by the optical signal-emitting unit 12. Then, the coupled monitor light is incident into the optical fiber line 14. An optical filter may be set between the optical signal-emitting unit 12 and the optical coupler 13 to avoid the leakage of the monitor light to the optical signal-emitting unit 12. The monitor light is reflected by the optical filter 22 of the optical branch apparatus 15 to be received by the OTDR 11. The OTDR 11 detects whether the optical accordance with the assumption that it will be applied to the optical fiber line-managing system in FIG. 2.

When a light multiplexed by a monitor light and a signal light is incident from the optical fiber line monitor (light signal transmitter) 10 through the optical fiber line 14 to the input optical waveguide 2 of the optical branch apparatus 1, the propagation loss of 3 dB is occurred at the first branch port 4a. The attenuation of the reflected light in the optical branch apparatus 1 is 6 dB, because the reflected light from the optical filter 7 is also attenuated by 3 dB during passing through the first branch port 4a again. The reflected light thus attenuated is propagated through the optical fiber line 14 to be incident into the light signal transmitter 10. Thus, the reflection attenuation calculated by the aforementioned expression (1) is increased to be 53 dB to 60 dB, so that the lasing of the semiconductor laser can be stable. In this case, though the monitor light is attenuated in passing through the first branch port 4a, it is confirmed that this dose not affect to the monitoring of the optical fiber line 14.

Therefore, in the filter insertion type of the optical branch apparatus as explained above, while the optical propagation loss of the slit 6 can be suppressed, the operability of setting the optical filter can be improvement, because the slit 6 is formed to have a width grater than a thickness of the optical filter 7 by 10 to 20 μm.

Further, a fluctuation of optical characteristics based on a temperature dependence change of a refraction index of a bonding agent for fixing the optical filter is suppressed, because the angle α of the slit 6 relative to the side face of the optical branch apparatus 1 is set to be 82 to 84 degrees. In this case, if the angle α is less than 82 degrees, the optical propagation loss is increased. On the other hand, if the angle α is more than 84 degrees, the reflection attenuation is decreased. Thus, the same effect as the above is expected by forming the slit 6 at the angle of 82 to 84 degrees in its depthwise direction.

Even further, the optical filter 7 is stable to be fixed in position by the bonding agent, and the break and/or crack of the optical branch apparatus are avoided at the ultrasonic rinsing process, because the depth of the slit 6 is as shallow as 10% of the thickness of the optical branch apparatus 1. In order to provide the same effect, the depth of the slit 6 is preferable to be 8 to 12% of the thickness of the optical branch apparatus 1.

In the filter insertion type of the optical branch apparatus in the preferred embodiment according to the invention, the slit 7 may be formed between the branch port 4b of the second stage and the branch port 4c of the third stage, or between the branch port 4c of the third stage and the branch port 4d of the fourth stage. However, in forming the slit, the best position is between the first branch port 4a and the second branch port 4b, because the formation of the slit is harder due to the increase in number of cases of the branched optical waveguides, if a position is selected on the output side of the optical branch apparatus.

Therefore, in the filter insertion type of the optical branch apparatus of the present invention, the reflected light incident into the optical signal transmitter is decreased, the reflection attenuation is increased, and the optical propagation loss is suppressed, because the optical filter which has a pass band of a predetermined wavelength is provided on the output port side of the first branch port of the optical waveguide on the waveguide substrate.

As this invention may be embodied in several forms without departing from the spirit of essential characteristics thereof, the present embodiment is therefore illustrative and not restrictive, since the scope of the invention is defined by the appended claims rather than by the description preceeding them, and all changes that fall within meets and bounds of the claims, or equivalence of such meets and bounds are therefore intended to embraced by the claims.

We claim:

1. A filter insertion type of an optical branch apparatus, comprising:

an input port for receiving input lights of first and second predetermined wavelengths;

output ports for supplying output lights obtained by branching said light of said first predetermined wavelength;

optical waveguides branched by branch ports of first to Nth stages, one of said optical waveguides being connected to said input port, and a predetermined number of said optical waveguides being connected to said output ports, where N is a positive integer; and an optical filter to intersect a predetermined number of said optical waveguides for transmitting said light of said first predetermined wavelength, and reflecting said light of said second predetermined wavelength, said optical filter being provided to be on a side of said output ports relative to a branch port of said first stage.

2. The optical branch apparatus, as defined in claim 1, wherein:

said optical filter is provided between said branch ports of said first and second stages.

3. The optical branch apparatus, as defined in claim 1, wherein:

said optical filter is inserted in a slit formed in a substrate, said optical waveguides being formed on said substrate.

4. The optical branch apparatus, as defined in claim 3, wherein:

said slit has a width larger than a thickness of said optical filter by 10 to 20 $\mu$m.

5. The optical branch apparatus, as defined in claim 3, wherein:

said slit has a depth of 8 to 12% of a thickness of said substrate.

6. The optical branch apparatus, as defined in claim 3, wherein:

said slit is formed to have an angle of 82 to 84 degrees relative to an optical axis of said input light supplied to said input port.

* * * * *